United States Patent Office 3,449,018
Patented June 10, 1969

3,449,018
HYDRAULIC BRAKE CONTROL VALVES
Eric Charles Hales, Birmingham, England, assignor to Girling Limited
Filed Jan. 22, 1968, Ser. No. 699,645
Claims priority, application Great Britain, Feb. 21, 1967, 8,216/67
Int. Cl. B60t 13/00, 8/18, 11/10
U.S. Cl. 303—6                                                                       4 Claims

ABSTRACT OF THE DISCLOSURE

In a brake pressure control valve of the type having a piston controlling operating movement of an internal valve for cutting off the inlet from the outlet of the control valve, the piston works within a sleeve which is itself slidable in a bore in the valve body. When the inlet pressure increases, the piston is moved relative to the sleeve to close the internal valve, and thus vary the rate at which pressure is transmitted through the control valve. When the inlet pressure is relieved, outlet pressure is quickly relieved by displacement not only of the piston, but also of the sleeve. The internal valve may be a valve ball located in a radial bore through the sleeve and co-operating with a seat formed in the bore. The ball is normally held off its seat by the piston, but when the piston is displaced relative to the sleeve, due to an increase in inlet pressure, the valve is allowed to close, assisted by the increased pressure.

Figure 1:
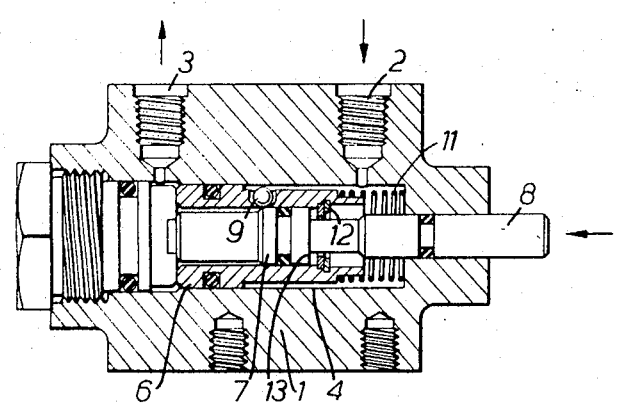

This invention relates to hydraulic brake control valves for use in controlling the hydraulic pressure at a brake or brakes relative to a pressure transmitted to the valve (from a master cylinder or other source).

In use, such valves normally have their inlets connected to the pressure source, and their outlets to a particular brake or group of brakes, usually the rear brakes of a vehicle.

There have been many prior proposals for such valves. Typically, such a valve has a piston cooperating with an internal valve which is normally open to connect the inlet and outlet of the valve, but is closed in response to movement of the piston due to an increase in pressure at the inlet of the valve, to cut off the inlet from the outlet, whereafter any further increase in inlet pressure is either transmitted to the outlet at a reduced rate, or is not transmitted to the outlet at all. According to one particular prior proposal, the piston is single acting, in that it has only one face subjected to fluid pressure, namely the pressure prevailing in the outlet of the valve. The piston is loaded in the opposite sense by an external preload which may be fixed or variable. In this case, when the pressure at the inlet is released, the outlet pressure is relaxed by opening movement of the valve member away from a fixed seat, under the action of a spring bias, assisted by the outlet pressure acting on a small area on the outlet side of the valve.

While the above described valves may be made to work satisfactorily, it is desirable to construct a brake pressure control valve in such a manner that it can respond very rapidly to a reduction in inlet pressure to relieve pressure in the valve outlet, but on the other hand so that its manufacture is not unduly complicated or expensive.

These aims can be achieved by means of the present invention, in accordance with which there is provided a brake pressure control valve comprising a valve body formed with an inlet and an outlet each communicating with a bore, a sleeve slidable in the bore, a piston slidable in the sleeve, and valve means in the sleeve closable to cut off the inlet from the outlet in response to movement in one direction of the piston relative to the sleeve due to an increase in inlet pressure, whereupon a further increase in inlet pressure is transmitted to the outlet at a reduced rate by the piston moving in the opposite direction.

By virtue of the piston working in a sleeve which can itself slide in the bore of the valve body, outlet pressure can be relieved very quickly by axial movement of the sleeve and piston together away from the outlet, thereby accommodating a relatively large volume change for a given piston displacement. Furthermore, mass-production of such valves is facilitated by the fact that largely standard components can be employed for making valves of differing operating characteristics, only the internal diameter of the sleeve and the external diameter of the piston requiring variation from one valve to another.

Some constructional forms of control valve in accordance with the invention will now be described, by way of example only, with reference to the accompanying drawings, in which:

FIGURES 1, 2, 3 and 4 are cross-sectional elevations of four different control valves.

In the different figures, the same reference numerals are used to refer to corresponding parts of the different valves.

The valve shown in FIGURE 1 includes a body 1 having an inlet 2 and an outlet 3 each communicating with a bore 4 in which slides a sleeve 6 sealed in the bore. A piston 7 working in the sleeve has a stem 8 which extends through one end wall of the body 1, and can thus receive a spring load dependent upon the loading of the vehicle. The sleeve is formed with a radial port whose inner end forms a seating for a ball valve 9. Normally the sleeve is held in its extreme left hand position (as shown) by a light spring 11, and the piston by the external control spring (not shown). In this position, the ball is held off its seating by the piston, and there is free fluid communication between the inlet and the outlet, which are normally connected to a master cylinder and the rear brake or brakes, respectively. Outward movement (to the right) of the piston relative to the sleeve is limited by a split ring washer 12 engagable by a step 13 at the outer end of the piston.

In use, when the brakes are operated to increase the pressure in the inlet 2, fluid initially flows freely past the valve ball from the inlet to the outlet. When the pressure reaches a value sufficient to overcome the external spring force, the piston is forced outwardly, thereby allowing the valve ball to close and isolate the outlet from the inlet. Any further increase in inlet pressure, acting on the piston step 13, moves the piston inwardly again to transmit pressure at a reduced rate and to unseat the valve ball. These actions can occur repeatedly to meter fluid to the valve outlet, so that after initial closure of the valve, the outlet pressure increases at a reduced rate relative to the inlet pressure.

On release of the master cylinder pressure, the piston and sleeve both move outwardly to reduce the outlet pressure by virtue of the resultant increase in volume in the outlet side of the piston and sleeve. When the master cylinder pressure drops below the outlet pressure, the valve ball is unseated, due to the pressure difference across the ball, to allow free return flow of fluid through the valve, after which the piston moves relative to the sleeve to a position which prevents closure of the ball valve.

Figure 2:
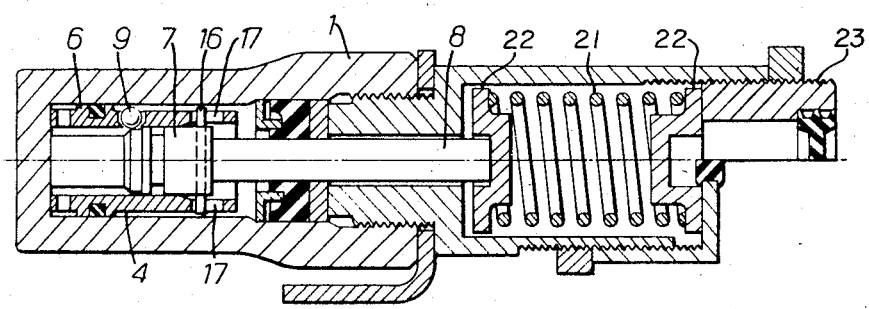

The valve shown in FIGURE 2 is generally similar to that of FIGURE 1, but includes a radial pin 16 through the piston, the ends of the pin engaging in axial slots 17 in the sleeve, whereby relative movement between the sleeve and piston is mechanically limited in both directions, thus preventing the possibility of the valve ball riding over the piston seal.

That is to say, the mechanical abutments limit relative movement of the piston and sleeve to the extent that the piston seal only contacts a smooth and uninterrupted portion of the interior surface of the sleeve.

Additionally, FIGURE 2 illustrates a case in which the piston 7 is subjected to a predetermined preload exerted by a control spring 21 acting between a pair of cups 22, one of which bears against the stem 8 and the other against a screwed bush 23 which is adjustable to set the preload in the spring as desired.

Figure 3:
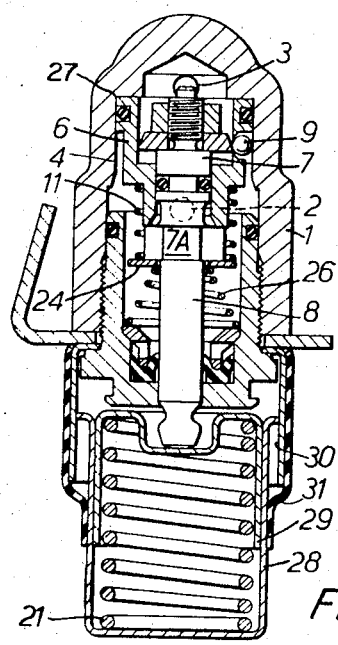

In the valve shown in FIGURE 3, the spring 11 which urges the sleeve 6 towards the outlet end of the bore 4 works against a washer 24 held against a collar 7A on the piston by a stronger spring 26. The internal diameter of the sleeve 6 is stepped and the radial hole which houses valve ball 9 is positioned in the larger diameter portion of the sleeve. The piston 7 has an extension with a collar 27 for co-operation with the valve ball. The sealed part of the piston slides in the smaller internal diameter of the sleeve, and is prevented from leaving this diameter by virtue of the mechanical abutments between the piston and the sleeve.

In this embodiment, the control spring 21 is enclosed in a pair of relatively movable cups 28, 29, of which the outer cup 28 is fixed by means of a tubular member 30. A rubber sleeve 31 prevents the ingress of dirt.

Figure 4:
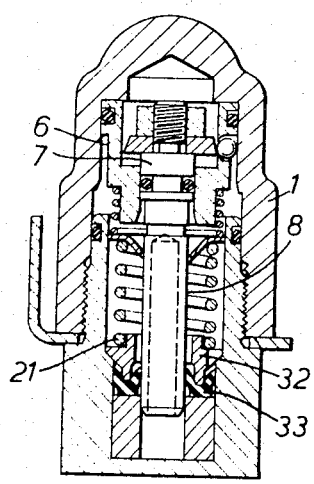

In the embodiment shown in FIGURE 4 (which is otherwise similar to that of FIGURE 3), the control spring 21 is housed in a sealed cavity within the control valve, and works against a bush 32 bearing against a seal 33 which forms a seal about the piston stem 8. Even if the seal 33 were to fail, any resultant loss of hydraulic fluid would, in this case, be limited to that amount required to fill air space between the piston stem 8 and the adjacent end of the valve casing.

In each form of valve described above, outward movement of the sleeve upon release of the master cylinder (inlet) pressure results in a prompt reduction of braking (outlet) pressure due to the large volume change resulting from outward movement of the sleeve with the piston. Additionally valves of different characteristics for different vehicle requirements can be manufactured from largely standardised components by varying, from one valve to another, the internal diameter of the sleeve and the external diameter of the piston, with particular advantage in relation to high-volume production.

Various modifications in the constructional details of the valve will, of course, be possible. One such modification consists in providing a spring means to effect a light biassing force tending to close the valve 9 against its seating. This is to ensure proper closure of the valve even if the control valve is mounted in such an attitude that the valve 9 tends to remain open under the action of gravity. The spring could, for example, take the form of a simple spring band engaged over the outside of the sleeve 6.

I claim:
1. Brake pressure control valve comprising a body having a bore and means defining an inlet and an outlet communicating with opposite ends of said bore, a sleeve slidable within said bore, spring means biassing said sleeve towards the outlet end of said bore, a piston slidable within said sleeve and having first and second opposed piston surfaces, said first piston surface having a larger effective area than said second piston surface and being exposed to fluid pressure prevailing at said outlet and the second piston surface exposed to fluid pressure prevailing at said inlet, normally open valve means carried by said sleeve and comprising a valve seat in said sleeve and a valve member separate from said sleeve and piston and cooperating with said seat, and means carried by said piston for controlling said valve member in response to movement of said piston relative to said sleeve, said valve controlling means being constructed and arranged to close said valve means and cut off communication between said inlet and said outlet in response to movement of said piston relative to said sleeve toward said inlet, movement of said sleeve toward said inlet being effective to relieve an excess of outlet pressure over inlet pressure.

2. A brake pressure control valve comprising a body having a bore, means defining an inlet and an outlet communicating with said bore, a sleeve slidable in said bore, a piston slidable in said sleeve, internal valve means mounted in said sleeve and normally open to connect said inlet and outlet, and means responsive to movement of said piston relative to said sleeve to close said internal valve means, said valve means comprising a valve seat, a radial hole through said sleeve and a co-operating valve member normally engaged and unseated by said piston.

3. Brake pressure control valve as claimed in claim 2, wherein said piston carries a piston seal in sliding contact with the interior surface of said sleeve, and including mechanical abutment means preventing said seal from contacting a region of said surface adjacent said valve seat.

4. Brake pressure control valve as claimed in claim 2, wherein said sleeve is stepped so as to have axially adjacent first and second portions, said first portion having an internal diameter greater than that of said second portion, said piston making sealed engagement with said second portion, said radial hole being formed in said first portion, said piston having a projecting part extending into said first portion to co-operate with said valve member.

References Cited
UNITED STATES PATENTS

| 3,258,924 | 7/1966 | Stelzer | 303—6 XR |
| 3,315,469 | 4/1967 | Stelzer | 303—6 XR |
| 3,358,445 | 12/1967 | Wallace | 303—6 XR |

FERGUS S. MIDDLETON, Primary Examiner.
JOHN J. McLAUGHLIN, JR., Assistant Examiner.

U.S. Cl. X.R.
60—54.5; 137—505.46, 505.47; 188—152; 303—22